(No Model.)
J. F. MAXSON.
MOLE TRAP.
No. 326,766. Patented Sept. 22, 1885.
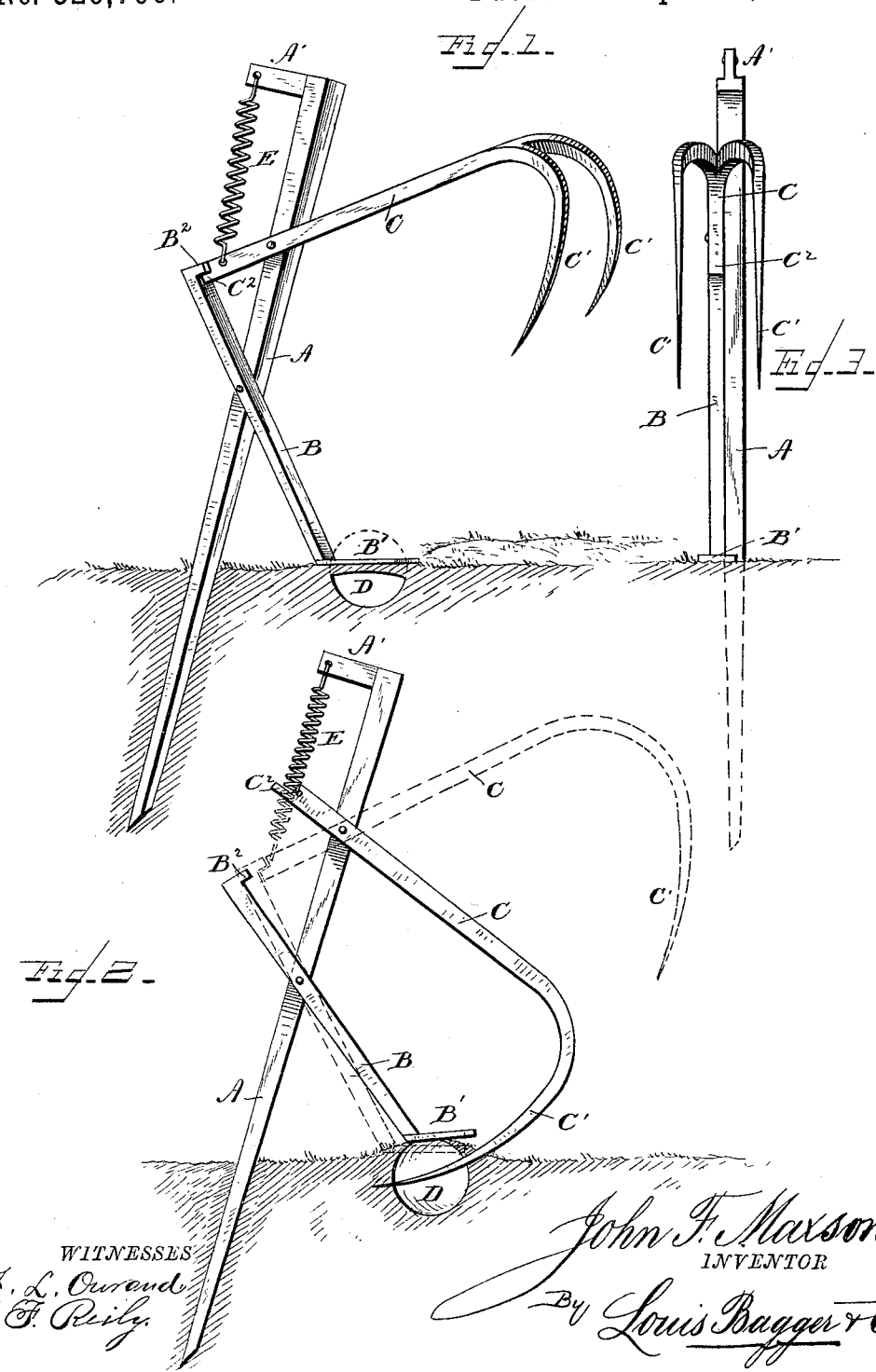
WITNESSES
F. L. Ourand
J. F. Reily
John F. Maxson
INVENTOR
By Louis Bagger & Co.
Attorneys.

UNITED STATES PATENT OFFICE.

JOHN F. MAXSON, OF HARTFORD, CONNECTICUT.

MOLE-TRAP.

SPECIFICATION forming part of Letters Patent No. 326,766, dated September 22, 1885.

Application filed June 13, 1885. (No model.)

*To all whom it may concern:*

Be it known that I, JOHN F. MAXSON, a citizen of the United States, and a resident of Hartford, in the county of Hartford and State of Connecticut, have invented certain new and useful Improvements in Mole-Traps; and I do hereby declare that the following is a full, clear, and exact description of the invention, which will enable others skilled in the art to which it appertains to make and use the same, reference being had to the accompanying drawings, which form a part of this specification.

My invention has for its object the production of an improved trap which is especially designed for the capture of moles, being adapted to be placed in operative position, so as to secure the mole at the moment when the latter is endeavoring to make an exit from its hole.

To this end my invention consists in the improved construction, arrangement, and combination of parts, which will be hereinafter fully described, and particularly pointed out in the claims.

Referring to the annexed drawings, Figure 1 is a perspective view of my improved mole-trap, showing the same in its set or open position. Fig. 2 is a side view of the same, showing the trap as it appears after it has been sprung, and Fig. 3 is a front view of the trap in its open or set position.

The same letters of reference indicate corresponding parts in all the figures.

Referring to the several parts by letter, A represents the leg or stationary portion of the trap, the lower portion of which is adapted to be inserted into the ground to one side of the exit from the mole-hole. The upper end of this leg A is formed with the short transverse arm A', for the purpose hereinafter specified.

B represents a lever, which is pivotally secured at a point near its upper end to the leg A, the lower end of this lever being bent and flattened to form a plate, B', which extends forward at an angle to the lever, as shown, for the purpose hereinafter specified, while the upper end of the lever B is formed with a forwardly-extending projection, $B^2$, adapted to engage with a similar projection, $C^2$, on the rear end of the operative arm C, when the latter is raised to be set in its open position.

C indicates the operative arm, which is pivotally secured at a point near its rear end upon the leg A, above the point where the lever B is secured thereto, the said operative arm being formed at its forward end with the downwardly-curved tines or teeth C', of which there may be two, four, or, in fact, any desirable number, while its rear end is formed with the projection $C^2$, adapted to engage with the similar projection $B^2$ on the upper end of the lever B when the trap is "set."

In placing the trap in operative position, the lower portion of the leg A is inserted into the ground at a suitable distance to one side of the hole, the mouth of which is indicated in the drawings by the letter D. The dirt immediately surrounding the mouth of this hole is then scraped away, so as to leave a recess about one-half of an inch deep, when it is replaced and pressed down, so as to occupy only about one-half of the depth of the recess from which it was removed. The leg A is now depressed into the ground until the plate B' on the lower end of the lever B rests lightly on the top of the earth in the recess before mentioned, the operative arm C being raised until the projection $C^2$ on its rear end comes beneath the projection $B^2$ on the upper end of the lever B, the arm C being thereby held in its raised or open position.

When the mole endeavors to come out of his hole, he presses against the dirt over the mouth of the same, thereby raising the plate B' and turning the lever B, so as to free the rear end of the arm C, a spiral spring, E, being secured at one end to the rear end of the said arm and at the other end to the short transverse arm A' at the upper end of the leg A, and serving to operate the arm C when its rear end is released, as just described, when the tines or teeth on the arm C enter the earth on each side of the plate B' and strike into the mole, no matter from which side he may be working.

From the foregoing description, taken in connection with the accompanying drawings, the construction and operation of my improved mole-trap will be readily understood without requiring further explanation.

It will be seen that my improved trap is simple in construction, and therefore not liable to break or get out of order, is cheap and durable, and at the same time is very effective in its operation.

Having thus described my invention, what

I claim, and desire to secure by Letters Patent of the United States, is—

1. The combination of the stationary support or leg, the pivoted releasing-lever formed in a single piece, having at its lower end a plate formed integral therewith and provided with the projection at its upper end, and the pivoted arm formed at its forward end with the tines or teeth, and having the projection at its rear end, all constructed, combined, and arranged to operate in the manner and for the purpose shown and set forth.

2. The combination of the stationary support or leg, having the short arm at its upper end, the pivoted releasing-lever formed in a single piece, having at its lower end the plate formed integral therewith, and provided with the projection at its upper end, the pivoted operative arm formed at its forward end with the tines or teeth, and having the projection at its rear end, and the spiral spring arranged as described, all constructed, combined, and arranged to operate in the manner and for the purpose shown and set forth.

In testimony that I claim the foregoing as my own I have hereunto affixed my signature in presence of two witnesses.

JOHN F. MAXSON.

Witnesses:
W. S. BRIDGMAN,
ALPHEUS H. SNOW.